United States Patent
Lin et al.

(10) Patent No.: US 6,918,397 B2
(45) Date of Patent: Jul. 19, 2005

(54) FLUSH SYSTEM FOR DRY FILM PHOTORESIST REMOVER

(75) Inventors: Ta-Min Lin, Hsinchu (TW); Szu-Yao Wang, Hsin-Chu (TW); Chia-Fu Lin, Hsin-Chu (TW); Kai-Ming Ching, Taiping (TW); Wen-Hsiang Tseng, Hsinchu (TW)

(73) Assignee: Taiwan Semiconductor, Hsin Chu (TW)

( * ) Notice: Subject to any disclaimer, the term of this patent is extended or adjusted under 35 U.S.C. 154(b) by 430 days.

(21) Appl. No.: 10/127,086

(22) Filed: Apr. 22, 2002

(65) Prior Publication Data

US 2003/0196684 A1 Oct. 23, 2003

(51) Int. Cl.⁷ .............................. B08B 7/04; B08B 9/093
(52) U.S. Cl. .................. 134/22.18; 134/10; 134/22.11; 134/22.12; 134/104.1; 134/111
(58) Field of Search .............................. 134/104.1, 111, 134/10, 22.11, 22.12, 22.18

(56) References Cited

U.S. PATENT DOCUMENTS

| | | | | |
|---|---|---|---|---|
| 3,911,938 A | * | 10/1975 | Wiltrout | 134/104.1 |
| 4,029,114 A | * | 6/1977 | Wiltrout | 134/104.1 |
| 6,589,358 B1 | * | 7/2003 | Suehiro | 134/10 |

* cited by examiner

Primary Examiner—Alexander Markoff
(74) Attorney, Agent, or Firm—Tung & Associates

(57) ABSTRACT

A flush system comprising a network of conduits, valves and screens that can be interposed between the process container and solvent re-claim tank components of a dry film photoresist (DFR) remover system, for example, that is used in the processing and packaging of integrated circuit chips. By operation of the valves in the flush system, DFR particles can be removed from the DFR remover system in order to prevent or minimize particle clogging of a particle filter in the DFR remover system. The screens in the flush system can be periodically cleaned by reverse flow of solvent or by operation of a nitrogen and DI (deionized) water purge system.

12 Claims, 2 Drawing Sheets

FLUSH SYSTEM FOR DRY FILM PHOTORESIST REMOVER

FIELD OF THE INVENTION

The present invention relates to the packaging of semiconductor integrated circuits. More particularly, the present invention relates to an auto flush system for a dry film photoresist remover which is used to remove a photoresist film from a semiconductor chip after the formation of ball grid array (BGA) solder bumps on the chip.

BACKGROUND OF THE INVENTION

One of the last processes in the production of semiconductor integrated circuits (IC) is multi-leveled packaging, which includes expanding the electrode pitch of the IC chips containing the circuits for subsequent levels of packaging; protecting the chip from mechanical and environmental stress; providing proper thermal paths for channeling heat dissipated by the chip; and forming electronic interconnections. The manner in which the IC chips are packaged dictates the overall cost, performance, and reliability of the packaged chips, as well as of the system in which the package is applied.

Package types for IC chips can be broadly classified into two groups: hermetic-ceramic packages and plastic packages. A chip packaged in a hermetic package is isolated from the ambient environment by a vacuum-tight enclosure. The package is typically ceramic and is utilized in high-performance applications. A chip packaged in a plastic package, on the other hand, is not completely isolated from the ambient environment because the package is composed of an epoxy-based resin. Consequently, ambient air is able to penetrate the package and adversely affect the chip over time. Recent advances in plastic packaging, however, has expanded their application and performance capability. Plastic packages are cost-effective due to the fact that the production process is typically facilitated by automated batch-handling.

A recent development in the packaging of IC chips is the ball grid array (BGA) package, which may be utilized with either ceramic packages or plastic packages and involves different types of internal package structures. The BGA package uses multiple solder balls or bumps for electrical and mechanical interconnection of IC chips to other microelectronic devices. For example, a very large scale integration (VLSI) or an ultra large scale integration (ULSI) chip may be electrically connected to a circuit board or other next level packaging substrate using the solder balls or bumps. The BGA technique is included under a broader connection technology known as "Controlled Collapse Chip Connection-C4" or "flip-chip" technology.

As illustrated in FIG. 1, in BGA or "flip-chip" packaging technology, the IC chip substrate 1, which often contains millions of integrated circuits, is initially layered with a fixture or solder resist material 2, which may be a dry film photoresist (DFR) layer and which functions as a mold for subsequent formation of multiple solder bumps 4 on the chip substrate 1. The DFR layer 2 is typically about 120 μm thick, and multiple apertures 3, corresponding to the matrix array of solderable surfaces on the chip substrate 1, extend through the PR layer 2. Solder paste is then applied to the DFR layer 2 using a squeegee, and the solder paste fills the apertures 3. As the solder paste is subsequently reflowed by heating, the solder paste forms mushroom-shaped solder bumps 4 which attach to solder pads on the surface of the chip substrate 1. Finally, the DFR layer is removed, leaving the solder bumps 4 on the surface of the chip substrate 1 for connection of microelectronic devices thereto.

FIG. 2 illustrates a typical conventional system for removal of dry film photoresist (DFR) polymer material. The system 10 includes a process container 11, typically having an outer tank 12 connected in fluid communication with an inner tank 13. A container outlet conduit 15 leads from the inner tank 13 to a solvent re-claim tank 16, which is connected to a particle filter 18 by a tank outlet conduit 17. The particle filter 18 is capable of filtering particles of about 0.1 μm wide and larger. A filter outlet conduit 19 connects the particle filter 18 to a circulation pump 20, and a pump outlet conduit 21 connects the circulation pump 20 to the outer tank 12 of the process container 11.

FIG. 3 illustrates a typical process for removing the DFR polymer film 2 from the chip substrate 1 after formation of the solder bumps 4 thereon, using the system 10 of FIG. 2. After the chip substrate 1 is initially placed in the inner tank 13 of the process container 11, organic solvent normally contained in the outer tank 12 is allowed to flow into the inner tank 13. The chip substrate 1 is allowed to soak in the organic solvent for about 5–10 minutes, during which time DFR particles 6 begin to dislodge from the DFR layer 2 into the solvent. Finally, the chip substrate 1 is agitated in the inner tank 13, such as by use of sonic waves, and the remaining DFR particles 6 are dislodged from the chip substrate 1 and into the solvent. The chip substrate 1 is then removed from the inner tank 13, with the DFR layer 2 removed therefrom and the solder bumps 4 remaining thereon. The organic solvent is then drained from the outer tank 12 and into the solvent re-claim tank 16 and stored there until subsequent use of the solvent is required, at which time the solvent is distributed by operation of the circulation pump 20, through the particle filter 18 and back into the outer tank 12 of the process container 11.

As it flows from the outer tank 12, the solvent carries DFR particles having a variety of sizes to the solvent re-claim tank 16, and subsequently, to the particle filter 18, which effectively screens all particles having a size of typically about 0.1 μm and larger and prevents these particles from entering and clogging the circulation pump 20. However, many of the particles screened by the particle filter 18 have a size of about 1.5 mm to about 2.0 mm, and these larger particles tend to clog the particle filter 18 to such a degree as to render the particle filter 18 inoperative after about 2 hours of operation. Consequently, the particle filter 18 must be cleaned or replaced after about 2 hour segments of operation of the system 10, resulting in significant downtime for semiconductor chip processing.

SUMMARY OF THE INVENTION

Therefore, an object of the present invention is to provide a flush system for flushing particles from a dry film photoresist remover system.

Another object of the present invention is to provide a flush system which facilitates enhanced operating efficiency in a dry film photoresist remover system.

Still another object of the present invention is to provide a self-cleaning flush system for removing particles from a dry film photoresist remover system.

Yet another object of the present invention is to provide a flush system for removing particles from a dry film photoresist remover system, which flush system may be connected to a process controller for automatic operation of the flush system.

A still further object of the present invention is to provide a flush system which is capable of facilitating increasing the wafer per hour (WPH) processing of semiconductor wafer chips in a semiconductor production facility.

In accordance with these and other objects and advantages, the present invention is directed to a flush system comprising a network of conduits, valves and screens interposed between the process container and solvent re-claim tank components of a dry film photoresist (DFR) remover system that is used in the processing and packaging of integrated circuit chips. By operation of the valves in the flush system, DFR particles can be removed from the DFR remover system in order to prevent or minimize particle clogging of a particle filter in the DFR remover system. The screens in the flush system can be periodically cleaned by reverse flow of solvent or by operation of a nitrogen and DI (deionized) water purge system.

BRIEF DESCRIPTION OF THE DRAWINGS

The invention will now be described, by way of example, by reference to the accompanying drawings, wherein.

DESCRIPTION OF THE PREFERRED EMBODIMENTS

The present invention has particularly beneficial utility in flushing particles from a solvent in a dry film photoresist remover system used in the processing of semiconductor IC chips. However, the invention is not so limited in application and while references may be made to such dry film photoresist remover systems, the invention is more generally applicable to flushing particles from liquids in a variety of industrial and product applications.

Figure 2:
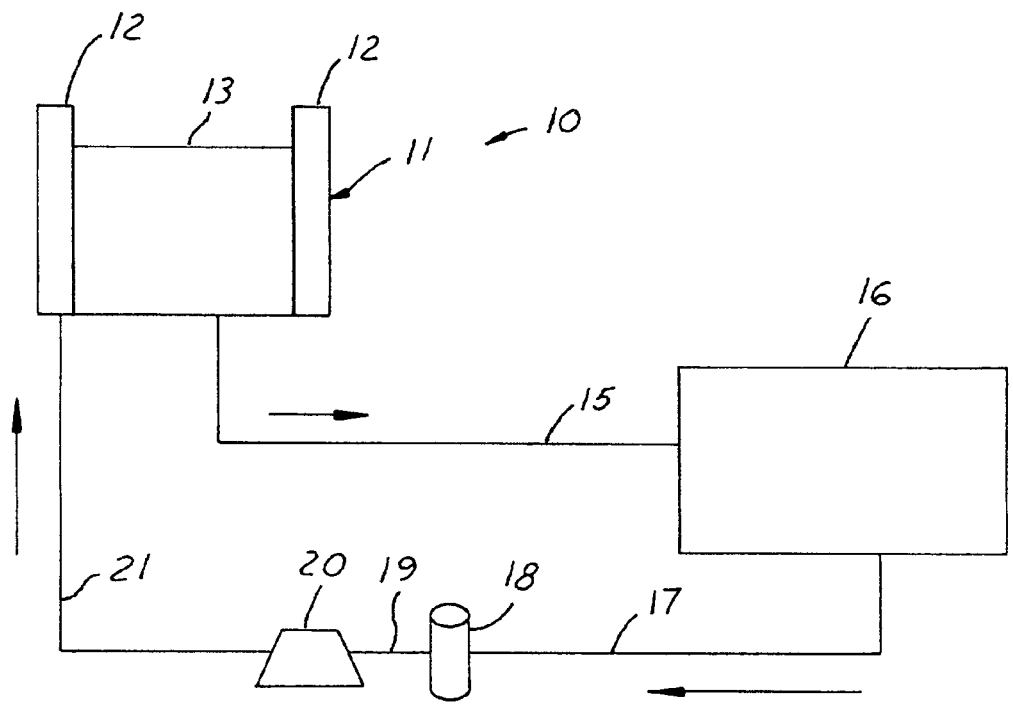
FIG. 2 is a schematic view of a conventional dry film photoresist layer remover system.
Figure 4:
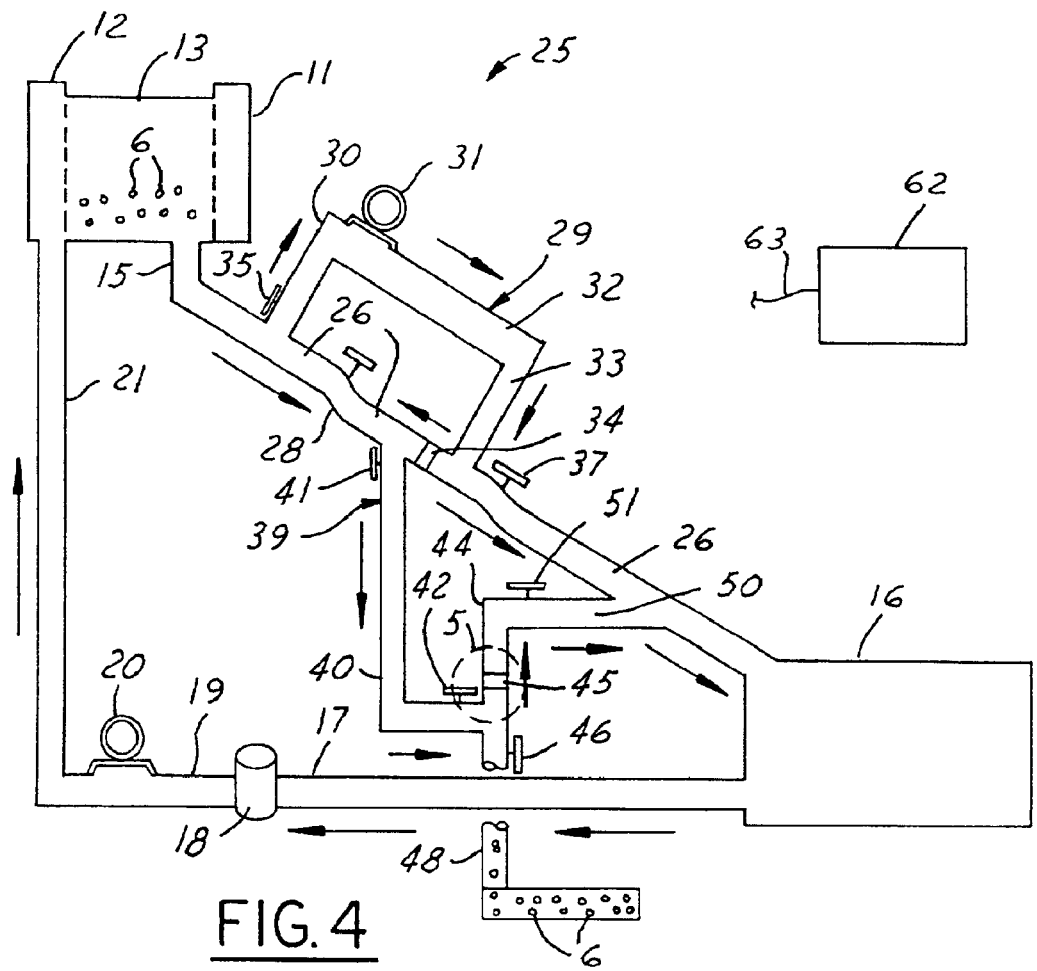
FIG. 4 is a schematic view illustrating the flush system of the present invention.
Figure 5:
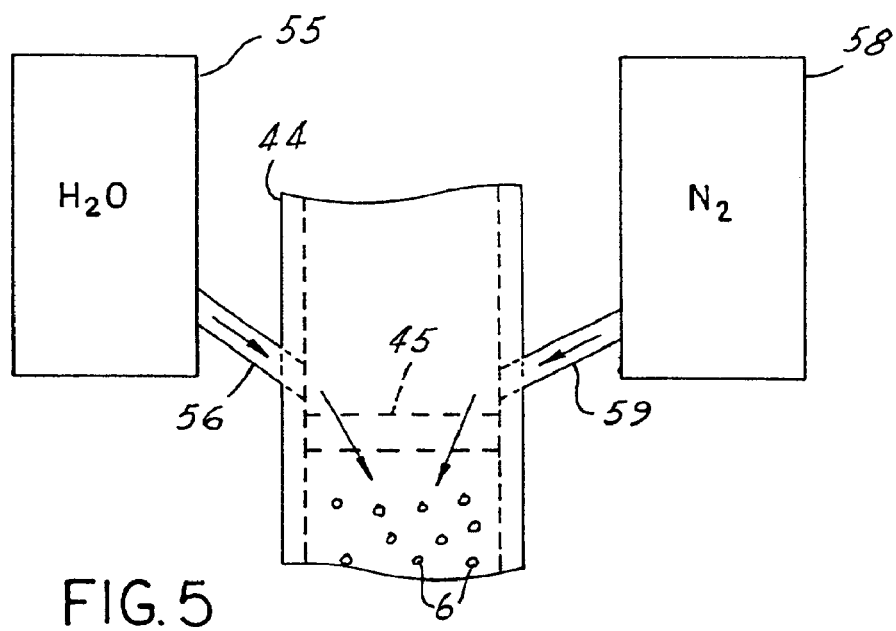
FIG. 5 is a side view, taken along section line 5 in FIG. 4, of a DI water and nitrogen gas purge system for the flush system of the present invention.

Referring to FIGS. 4 and 5 of the drawings, a flush system of the present invention, suitable for implementation in a dry film photoresist (DFR) remover system used in the semiconductor production industry, is generally indicated by reference numeral 25. The flush system 25 is interposed between the inner tank 13 of the upstream process container 11 and the downstream solvent re-claim tank 16 of the DFR remover system and is designed to prevent excessive clogging of a particle filter 18, which is connected to the solvent re-claim tank 16 by means of a tank outlet conduit 17, as described above with respect to the conventional DFR remover system 10 of FIG. 2. The particle filter 18 is connected to a circulation pump 20 by a filter outlet conduit 19, and the circulation pump 20 is connected to the outer tank 12 of the process container 11 by a pump outlet conduit 21, in conventional fashion. The flush system 25 of the present invention includes an elongated, sloped circulation conduit 26, the rear, upstream or upper end of which is provided in fluid communication with a container outlet conduit 15 that drains the inner tank 13, and the opposite front, downstream or lower end of which circulation conduit 26 is disposed in fluid communication with the solvent re-claim tank 16. A flush loop 29 of the flush system 25 includes a flush loop intake conduit 30 which is connected to the circulation conduit 26 through a loop entry valve 35; a flush loop pump 31 provided in fluid communication with the flush loop intake conduit 30; a pump conduit 32 extending from the flush loop pump 31; and a circulation re-entry conduit 33 which extends from the pump conduit 32 and is connected to the circulation conduit 26. A circulation valve 28 is provided in the circulation conduit 26, between the loop entry valve 35 and the circulation re-entry conduit 33 of the flush loop 29. A loop screen 34, having screen openings or pore sizes of typically about 12 µm, is further provided in the circulation conduit 26, between the circulation valve 28 and the circulation re-entry conduit 33. A backflow valve 37 is provided in the circulation conduit 26, between the discharge end of the circulation re-entry conduit 33 and the solvent re-claim tank 16.

The flush system 25 further includes a particle discharge unit 39, having a vertical particle drain conduit 40 extending downwardly from a particle drain valve 41 which is provided in fluid communication with the circulation conduit 26, at a point between the circulation valve 28 and the loop screen 34. The horizontal bottom portion of the particle drain conduit 40 is fitted with an outlet valve 42 which is connected to the bottom end portion of a vertical particle screen conduit 44. A particle screen 45, having screen or pore sizes of typically about 12 µm, is mounted in the particle screen conduit 44. A solvent re-entry valve 51 connects the upper end of the particle screen conduit 44 to the rear end of a horizontal solvent re-entry conduit 50, the front end of which terminates in fluid communication with the circulation conduit 26, just upstream of the entry point of the circulation conduit 26 into the solvent re-claim tank 16. A particle discharge valve 46 connects the bottom end of the particle screen conduit 44 to a particle discharge conduit 48.

As illustrated in FIG. 5, a DI (deionized) water supply 55 and a nitrogen gas supply 58 are each connected to the interior of the vertical particle screen conduit 44, by a water dispensing conduit 56 and a nitrogen dispensing conduit 59, respectively. The discharge ends of the water dispensing conduit 56 and the nitrogen dispensing conduit 59 in the particle screen conduit 44 are disposed just above the particle screen 45. The DI water supply 55 and the nitrogen supply 58 are operated to purge the particle screen 45 using water and nitrogen, respectively, as indicated by the arrows, and remove DFR particles 6 from the particle screen 45 as hereinafter further described.

Figure 1:
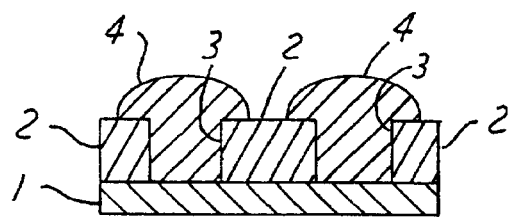
FIG. 1 is a cross-sectional view of a portion of a semiconductor IC chip, illustrating a DFR (dry film photoresist) layer formed on the chip substrate and solder bumps formed on the substrate using the DFR layer as a mold.
Figure 3:
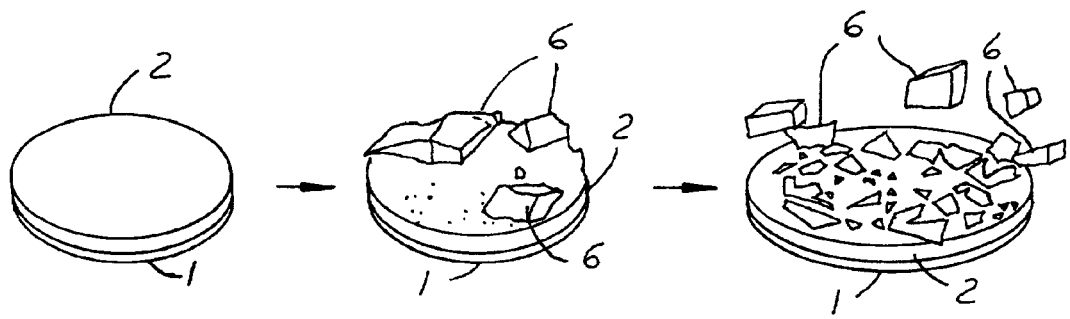
FIG. 3 is a flow diagram illustrating removal of the DFR layer from the chip substrate after formation of solder bumps thereon.

The flush system 25 of the present invention is operated as follows. After the chip substrate 1 is soaked in organic solvent and agitated in the inner tank 13 of the process container 11 to remove the DFR particles 6 therefrom, typically in the manner heretofore described with respect to the conventional DFR remover system 10 illustrated in FIGS. 1–3, the chip substrate 1 is removed from the inner tank 11 for further processing or packaging. The DFR particles 6 removed from the chip substrate 1 tend to settle in the bottom of the inner tank 13, and at least a substantial portion of the DFR particles 6 must be removed from the inner tank 13 prior to further processing of additional chip substrates 1 in the inner tank 13. Accordingly, the circulation valve 28 and and backflow valve 37 are opened, and the organic solvent, in which the DFR particles 6 are suspended, is distributed from the inner tank 13, through the circulation conduit 26 and into the solvent re-claim tank 16, as indicted by the white arrows. The flowing solvent passes through the loop screen 34, which removes from the solvent particles having a size on the order of reclaim about 12 μm and larger before the solvent proceeds through the remaining segment of the circulation conduit 26 and enters the solvent re-claim tank 16. The solvent is then pumped, by operation of the circulation pump 20, from the solvent re-claim tank 16, through the particle filter 18 and back to the outer tank 12 of the process container 11, as further illustrated by the white arrows. The particle filter 18 removes particles typically having a size on the order of about 0.1 μm and larger from the solvent before the solvent is pumped back to the outer tank 12. The heretofore-described circulation of solvent from the inner tank 13, through the solvent re-claim tank 16 and back to the outer tank 12 is continued for about 10 minutes, to remove most or all of the DFR particles 6 from the solvent. Accordingly, the loop screen 34 removes the larger-size (about 12 μm and larger) DFR particles 6 from the solvent before the solvent reaches the particle filter 18, thereby significantly reducing clogging of the particle filter 18 and prolonging filtering time of the DFR remover system. The loop screen 34 and particle filter 18 together therefore remove most or all of the DFR particles 6 from the solvent, and most of the DFR particles 6 are removed from the inner tank 13 of the process container 11, having been carried therefrom by the solvent before filtration.

After the solvent-filtering operation heretofore described is run for about 10 minutes to remove most or all of the DFR particles 6 from the inner tank 13, the flush system 25 is operated in a flush mode typically for about 5 minutes in order to remove and eliminate or flush the DFR particles 6 previously trapped by the loop screen 34 from the flush system 25. This is accomplished by initially closing both the circulation valve 28 and the backflow valve 37 and opening the loop entry valve 35 of the flush loop 29, as well as the particle drain valve 41, the outlet valve 42 and the solvent re-entry valve 51 of the particle discharge unit 39. The flush loop pump 31 of the flush loop 29 is then operated to pump solvent from the inner tank 13 through the loop entry valve 35 and the flush loop 29, into the circulation conduit 26, through the loop screen 34 and particle drain valve 41 and into the particle drain conduit 40 of the particle discharge unit 39, as indicated by the black arrows. The weight of the solvent column in the particle drain conduit 40 then pushes the advancing front of the solvent into the particle screen conduit 44 through the outlet valve 42 and into the solvent re-entry conduit 50 through the solvent re-entry valve 51. From the solvent re-entry conduit 50, the solvent enters the circulation conduit 26 and is discharged from there into the solvent re-claim tank 16 for subsequent circulation through the particle filter 18 and back to the outer tank 12 by operation of the circulation pump 20.

As it flows backwards through the loop screen 34 upon exit from the flush loop 29, as indicated by the black arrows, the solvent removes from the loop screen 34 the DFR particles 6 which had been previously trapped by the loop screen 34 upon forward pass of the solvent through the circulation conduit 26. Upon subsequent upward flow of the solvent through the particle screen conduit 44, the solvent passes through the particle screen 45 which, in turn, removes the DFR particles 6 previously flushed from the loop screen 34 by force of the backward-flowing solvent. The particle screen 45 removes particles typically having a size on the order of about 12 μm and larger, from the solvent. Consequently, most of the potential filter-clogging DFR particles 6 are removed from the solvent upon subsequent distribution of the solvent through the particle filter 18 during its transit back to the outer tank 12 of the process container 11.

After the flush mode of the flush system 25 heretofore described is continued typically for about 5 minutes to remove the previously-trapped DFR particles 6 from the loop screen 34, the particle discharge unit 39 may be operated in a purge mode typically for about 5 minutes to remove from the particle screen 45 DFR particles 6 which had been trapped thereby during the flush mode. Accordingly, after the particle discharge valve 46 is opened, the DI water source 55 and the nitrogen gas supply 58 are operated either simultaneously or sequentially to discharge deionized water and nitrogen gas, respectively, through the water dispensing conduit 56 and the nitrogen dispensing conduit 59, respectively, and against the particle screen 45. The water and nitrogen gas dislodge all or most of the DFR particles 6 from the particle screen 45, and the dislodged DFR particles 6 are discharged from the particle screen conduit 44, through the open particle discharge valve 46 and into the particle discharge conduit 48, from which the DFR particles 6 may be collected by a receptacle (not illustrated) or other waste elimination system.

As further illustrated in FIG. 4, the various operating components of the flush system 25 may be operated automatically using a process controller 62, having a microprocessor and enabling software and connected to the components typically by wiring 63. In that case, the loop entry valve 35, the circulation valve 28, the backflow valve 37, the particle drain valve 41, the outlet valve 42, the particle discharge valve 46 and the solvent re-entry valve 51 are typically electric.

While the preferred embodiments of the invention have been described above, it will be recognized and understood that various modifications may be made in the invention and the appended claims are intended to cover all such modifications which may fall within the spirit and scope of the invention.

Having described our invention with the particularity set forth above, we claim:

1. A flush system for removing particles from a container for a liquid, said flush system comprising:
   a circulation conduit having an intake end for connection to the container and receiving the liquid and a discharge end spaced from said intake end;
   a loop screen provided in said circulation conduit for removing the particles from the liquid upon a forward flow of the liquid through said loop screen;
   a flush loop having an intake end and a discharge end connected to said circulation conduit on respective sides of said loop screen for selectively receiving the liquid and facilitating reverse flow of the liquid through said loop screen;
   a particle discharge unit connected to said circulation conduit for selectively receiving the liquid and removing the particles from the liquid upon said reverse flow of the liquid through said loop screen; and
   a purge system comprising a nitrogen supply provided in said particle discharge unit for discharging nitrogen and dislodging the particles from said particle discharge unit.

2. The flush system of claim 1 further comprising a particle discharge conduit connected to said particle discharge unit for receiving and discharging the particles from said particle discharge unit.

3. The flush system of claim 1 wherein said flush loop comprises a flush loop intake conduit connected to said circulation conduit at said intake end of said flush loop, a circulation re-entry conduit connected to said circulation conduit at said discharge end of said flush loop, a pump conduit connecting said flush loop intake conduit to said circulation re-entry conduit, and a flush loop pump provided in said pump conduit for selectively pumping the liquid through said flush loop.

4. The flush system of claim 3 further comprising a particle discharge conduit connected to said particle discharge unit for receiving and discharging the particles from said particle discharge unit.

5. The flush system of claim 1 wherein said particle discharge unit comprises a particle drain conduit connected to said circulation conduit, a particle screen conduit connected to said particle drain conduit, a particle screen provided in said particle screen conduit, and a solvent re-entry conduit connected to said particle screen conduit and said circulation conduit.

6. The flush system of claim 5 further comprising a particle discharge conduit connected to said particle screen conduit of said particle discharge unit for receiving and discharging the particles from said particle discharge unit.

7. The flush system of claim 5 wherein said flush loop comprises a flush loop intake conduit connected to said circulation conduit at said intake end of said flush loop, a circulation re-entry conduit connected to said circulation conduit at said discharge end of said flush loop, a pump conduit connecting said flush loop intake conduit to said circulation re-entry conduit, and a flush loop pump provided in said pump conduit for selectively pumping the liquid through said flush loop.

8. The flush system of claim 5 further comprising a particle discharge conduit connected to said particle screen conduit of said particle discharge unit for receiving and discharging the particles from said particle discharge unit.

9. A flush system for removing particles from a container for a liquid, said flush system comprising:

a circulation conduit having an intake end for connection to the container and receiving the liquid and a discharge end spaced from said intake end;

a loop screen provided in said circulation conduit for removing the particles from the liquid upon a forward flow of the liquid through said loop screen;

a flush loop having an intake end and a discharge end connected to said circulation conduit on respective sides of said loop screen for selectively receiving the liquid and facilitating reverse flow of the liquid through said loop screen;

a particle discharge unit connected to said circulation conduit for selectively receiving the liquid and removing the particles from the liquid upon said reverse flow of the liquid through said loop screen, said particle discharge unit comprising a particle drain conduit connected to said circulation conduit, a particle screen conduit connected to said particle drain conduit, a particle screen provided in said particle screen conduit, and a solvent re-entry conduit connected to said particle screen conduit and said circulation conduit; and a purge system comprising a water supply and a nitrogen gas supply connected to said particle screen conduit for discharging water and nitrogen gas, respectively, against said particle screen and dislodging the particles from said particle screen.

10. The flush system of claim 9 further comprising a particle discharge conduit connected to said particle screen conduit of said particle discharge unit for receiving and discharging the particles from said particle discharge unit.

11. The flush system of claim 9 wherein said flush loop comprises a flush loop intake conduit connected to said circulation conduit at said intake end of said flush loop, a circulation re-entry conduit connected to said circulation conduit at said discharge end of said flush loop, a pump conduit connecting said flush loop intake conduit to said circulation re-entry conduit, and a flush loop pump provided in said pump conduit for selectively pumping the liquid through said flush loop.

12. A method of removing particles from a process container for a dry film photoresist remover system used to remove dry film photoresist from semiconductor chip substrates using a solvent, said method comprising:

providing a flush system comprising a circulation conduit having an intake end for connection to the process container and receiving the solvent and a discharge end spaced from said intake end, a loop screen provided in said circulation conduit for removing the particles from the solvent upon a forward flow direction of the solvent through said loop screen, a flush loop having an intake end and a discharge end connected to said circulation conduit on respective sides of said loop screen for selectively receiving the solvent and facilitating a reverse flow direction of the solvent through said loop screen, and a particle discharge unit connected to said circulation conduit for selectively receiving the solvent and removing the particles from the solvent upon said reverse flow of the solvent through said loop screen;

distributing the solvent from the process container through said circulation conduit in said forward flow direction through said loop screen to remove the particles from the process container and the solvent, respectively;

distributing the solvent back to the process container;

distributing the solvent from the process container through said flush loop and in said reverse flow direction through said loop screen to remove the particles from said loop screen;

distributing the solvent through said particle discharge unit to remove the particles from the solvent;

distributing the solvent back to the process container; and removing the particles from said particle discharge unit by directing water and nitrogen gas, respectively, against the particles.

* * * * *